(12) United States Patent
Garg et al.

(10) Patent No.: US 10,693,711 B1
(45) Date of Patent: Jun. 23, 2020

(54) REAL-TIME EVENT CORRELATION IN INFORMATION NETWORKS

(71) Applicant: EMC IP Holding Company LLC, Hopkinton, MA (US)

(72) Inventors: Aman Garg, Indore (IN); Ashwin Daswani, Ulhasnagar (IN); Mayank D. Desai, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

(21) Appl. No.: 15/922,268

(22) Filed: Mar. 15, 2018

(51) Int. Cl.
| | | |
|---|---|---|
| *H04L 12/24* | (2006.01) |
| *G06F 11/07* | (2006.01) |
| *G06F 11/30* | (2006.01) |
| *G06N 7/00* | (2006.01) |

(52) U.S. Cl.
CPC ...... *H04L 41/0631* (2013.01); *G06F 11/0709* (2013.01); *G06F 11/079* (2013.01); *G06F 11/3048* (2013.01); *H04L 41/12* (2013.01); *G06N 7/005* (2013.01); *H04L 41/16* (2013.01)

(58) Field of Classification Search
CPC ............ G06F 11/079; G06F 11/2257; G06F 11/3006; G06F 11/048; G06F 11/3051; H04L 41/0631; H04L 41/65; H04L 41/12; H04L 41/142; H04L 43/08; H04L 43/0823; G06N 7/005
See application file for complete search history.

(56) References Cited

U.S. PATENT DOCUMENTS

| | | | |
|---|---|---|---|
| 5,661,668 A | 8/1997 | Yemini et al. | |
| 5,761,502 A * | 6/1998 | Jacobs | H04L 41/16 |
| 6,076,083 A * | 6/2000 | Baker | H04L 69/40 |
| | | | 706/52 |
| 7,003,433 B2 | 2/2006 | Yemini et al. | |
| 9,053,000 B1 | 6/2015 | Lam et al. | |

(Continued)

OTHER PUBLICATIONS

S. Kliger et al., "A Coding Approach to Event Correlation," The Fourth International Symposium on Integrated Network Management IV, IFIP—The International Federation for Information Processing, 1995, pp. 266-277.

*Primary Examiner* — Gabriel Chu
(74) *Attorney, Agent, or Firm* — Ryan, Mason & Lewis, LLP

(57) ABSTRACT

Systems and methods are provided for managing information networks. A delta causality matrix is generated based on newly discovered topology changes in an information network. The delta causality matrix specifies changes in problem-symptom relationships of a causality matrix associated with constituent objects in a previous topology of the information network. The delta causality matrix is utilized to modify at least one context which comprises a first set of related symptoms and problems associated with the constituent objects in the previous topology of the information network. The modified context includes a second set of related symptoms and problems associated with constituent objects of the modified topology of the information network. An event correlation operation is performed utilizing the modified context and active symptoms detected in the information network, to determine at least one problem which has a symptom signature that corresponds to the set of current symptoms.

20 Claims, 6 Drawing Sheets

(56) References Cited

U.S. PATENT DOCUMENTS

| | | | |
|---|---|---|---|
| 9,537,720 B1* | 1/2017 | Baggott | H04L 41/12 |
| 9,736,046 B1 | 8/2017 | Jain et al. | |
| 9,811,588 B1 | 11/2017 | Ohsie et al. | |
| 2002/0019870 A1* | 2/2002 | Chirashnya | H04L 41/0681 |
| | | | 709/224 |
| 2006/0085689 A1* | 4/2006 | Bjorsne | G06F 11/0748 |
| | | | 714/39 |
| 2010/0115341 A1* | 5/2010 | Baker | G06F 11/0709 |
| | | | 714/37 |
| 2011/0228696 A1* | 9/2011 | Agarwal | H04L 41/12 |
| | | | 370/253 |
| 2017/0075749 A1* | 3/2017 | Ambichl | G06F 11/079 |

* cited by examiner

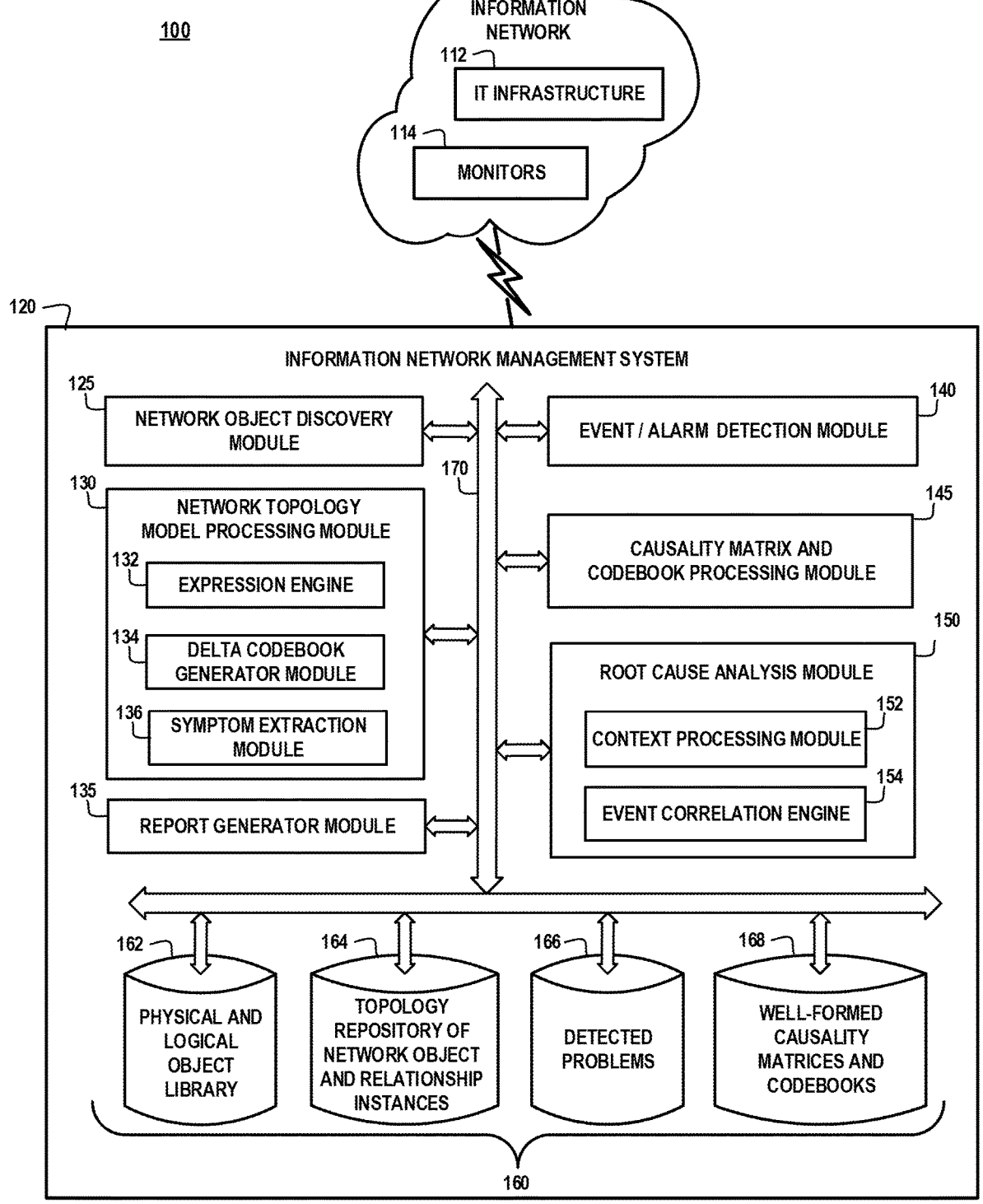

200

PROBLEMS

| SYMPTOMS | $P_1$ | $P_2$ | $P_3$ | $P_4$ | $P_5$ | $P_6$ |
|---|---|---|---|---|---|---|
| 1 | 1 | 0 | 1 | 1 | 0 | 1 |
| 2 | 1 | 1 | 1 | 1 | 0 | 0 |
| 3 | 1 | 1 | 1 | 0 | 1 | 0 |
| 4 | 1 | 0 | 0 | 0 | 1 | 1 |
| 5 | 1 | 0 | 0 | 1 | 0 | 1 |
| 6 | 1 | 0 | 1 | 0 | 0 | 1 |
| 7 | 1 | 1 | 1 | 0 | 0 | 1 |
| 8 | 1 | 0 | 0 | 1 | 1 | 1 |
| 9 | 0 | 0 | 0 | 0 | 1 | 1 |
| 10 | 0 | 1 | 1 | 1 | 1 | 0 |
| 11 | 0 | 0 | 0 | 1 | 1 | 0 |
| 12 | 0 | 1 | 0 | 1 | 0 | 0 |
| 13 | 0 | 1 | 0 | 0 | 1 | 0 |
| 14 | 0 | 0 | 0 | 0 | 0 | 1 |
| 15 | 0 | 0 | 1 | 0 | 1 | 1 |
| 16 | 0 | 1 | 1 | 0 | 0 | 1 |
| 17 | 0 | 1 | 0 | 0 | 1 | 1 |
| 18 | 0 | 1 | 1 | 1 | 0 | 0 |
| 19 | 0 | 1 | 1 | 0 | 1 | 0 |
| 20 | 0 | 0 | 0 | 0 | 1 | 1 |

PROBLEMS

| SYMPTOMS | | $P_1$ | $P_2$ | $P_3$ | $P_4$ | $P_5$ | $P_6$ |
|---|---|---|---|---|---|---|---|
| | 1 | 1 | 0 | 1 | 1 | 0 | 1 |
| | 3 | 1 | 1 | 1 | 0 | 1 | 0 |
| | 4 | 1 | 0 | 0 | 0 | 1 | 1 |

202

PROBLEMS

| SYMPTOMS | | $P_1$ | $P_2$ | $P_3$ | $P_4$ | $P_5$ | $P_6$ |
|---|---|---|---|---|---|---|---|
| | 1 | 1 | 0 | 1 | 1 | 0 | 1 |
| | 2 | 1 | 1 | 1 | 1 | 0 | 0 |
| | 3 | 1 | 1 | 1 | 0 | 1 | 0 |
| | 10 | 0 | 1 | 1 | 1 | 1 | 0 |
| | 15 | 0 | 0 | 1 | 0 | 1 | 1 |

400

REAL-TIME EVENT CORRELATION IN INFORMATION NETWORKS

FIELD

This disclosure relates generally to techniques for managing information networks.

BACKGROUND

With technological advances in computing, networking, and storage systems, information networks are becoming increasingly complex. Such complex information networks produce a large amount of event-based data that can be collected for network security and management analysis. The reliability of complex information networks depends on the ability to properly detect and manage problems that occur in such systems, wherein the detecting and handling of exceptional events (or alarms) plays a central role in network management. Problems can include component failures, congestion, faults, performance degradation, intrusion attempts, and other exceptional operational conditions that require handling. The problems that arise within an information network generate observable events, and these events can be monitored, detected, reported, analyzed and acted upon using automated methods.

As information networks have become more complex, the rate at which observable events occur has significantly increased, making problem management more difficult. Often, a single problem will be manifested through a large number of alarms. These alarms must be analyzed and correlated to determine their causes so that problems can be handled effectively. Automated event correlation and management techniques are utilized to reduce the number of symptoms in a system which needs to be analyzed, and to accurately determine the number and identity of discrete problems which need to be rectified. Unless events are correlated, a single problem in a single subsystem could result in multiple, uncoordinated corrective actions. Accordingly, the implementation of fast and efficient event correlation methods for problem detection can lead to great improvements in the quality and cost of information network management.

SUMMARY

Illustrative embodiments of the invention include methods for managing information networks. For example, one embodiment includes a method which comprises: receiving delta topology information, wherein the delta topology information specifies modifications to a previous topology of an information network; generating a modified topology of the information network based on the delta topology information; utilizing the delta topology information to generate a delta causality matrix, wherein the delta causality matrix comprises information which indicates a difference in one or more problem-symptom relationships included in a causality matrix that is associated with constituent objects in the previous topology of the information network; utilizing the delta causality matrix to modify at least one context which comprises a first set of related symptoms and problems associated with the constituent objects in the previous topology of the information network, such that the modified context comprises a second set of related symptoms and problems associated with constituent objects of the modified topology of the information network; and performing an event correlation operation utilizing the modified context and a set of current symptoms detected in the modified topology of the information network, to determine at least one problem within the modified topology of the information network which has a symptom signature that corresponds to the set of current symptoms.

Other embodiments of the invention include, without limitation, systems and articles of manufacture comprising processor-readable storage media, which are configured for managing information networks.

BRIEF DESCRIPTION OF THE DRAWINGS

FIG. 1 is a high-level schematic illustration of a computing system which implements a network management system that is configured to provide automated, real-time event correlation analysis for an information network, according to an embodiment of the invention.

FIG. 2A illustrates an example of a causality matrix which can be generated by a causality matrix and codebook processing module in the system of FIG. 1.

DETAILED DESCRIPTION

Figures 2B, 2C, 3:
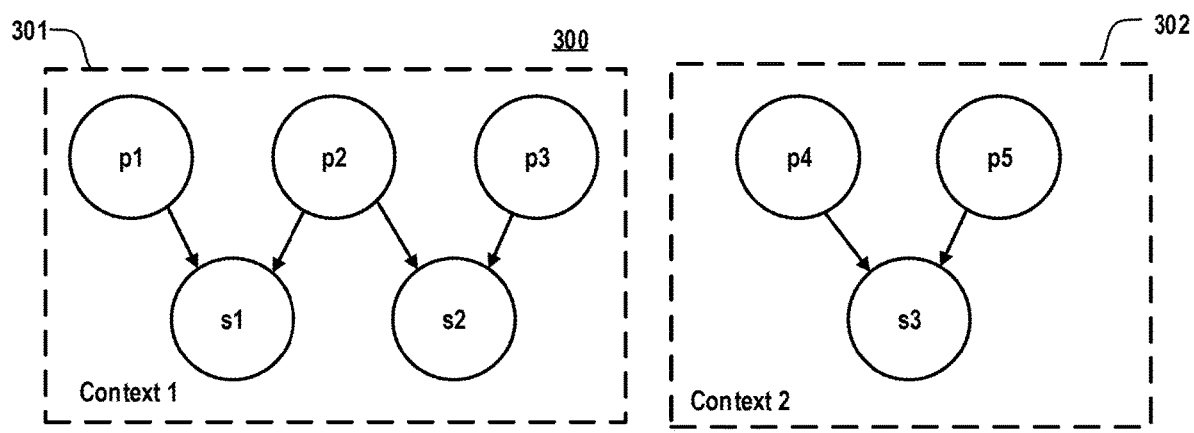
FIG. 2B illustrates an example of an optimal codebook which can be generated based on the causality matrix of FIG. 2A.
FIG. 2C illustrates another example of an optimal codebook which can be generated based on the causality matrix of FIG. 2A.
FIG. 3 illustrates an example causality graph of nodes comprising problems and symptoms, wherein different disjoint subgraphs of events of the causality graph provide independent contexts.

Illustrative embodiments of the invention will now be explained in further detail with regard to systems and methods for implementing real-time, or near real-time, event correlation analysis for management of information network systems such as datacenters, cloud computing platforms, etc. Embodiments of the invention provide improved event correlation through systems and methods that are configured to efficiently determine problem events from observable symptoms in real time or near real time. Various methods and algorithms are proposed to reduce the time and computational complexities for event correlation, which makes it suitable for real time event correlation.

Conventional methods for event correlation and root cause analysis are not suitably adapted for real-time event correlation. For example, conventional methods typically do not continually perform event correlation and root cause analysis in real time, but rather perform such operations periodically. For example, conventional network management systems may issue a command to initiate event correlation at predetermined periods (e.g., every 30 minutes, hour, etc.). In addition, conventional event correlation and root cause analysis frameworks are typically implemented by executing a single threaded code which makes the process extremely time consuming, and limits the ability to perform event correlation and problem detection in real time or near real time. Indeed, every time such code is executed, an entire causality matrix (or codebook) is computed over and over again (rather than just calculating a delta causality matrix (or delta codebook)). Furthermore, for every iteration, contexts are built from scratch instead of modifying existing contexts.

Embodiments of the invention address the above-noted limitations of conventional techniques in various ways. For example, exemplary embodiments of the invention provide methods for generating a delta causality matrix (or delta codebook) based on newly discovered topology changes in a dynamically changing information system, thereby eliminating the process of generating a full causality matrix from scratch after each discovery of topology changes. In addition, a root cause analysis engine according to an embodiment of the invention is configured to utilize the delta causality matrix (or delta codebook) to directly modify existing contexts, rather than build contexts from scratch after each discovery of topology changes. Furthermore, embodiments of the invention utilize a distributed event correlation engine framework to allow multiple segments of the correlation engine code to be executed in parallel over a distributed framework, thus augmenting the computing efficiency and reducing the latency for various function calls.

FIG. 1 is a high-level schematic illustration of a computing system which implements a network management system that is configured to provide automated, real-time event correlation analysis for an information network, according to an embodiment of the invention. In particular, FIG. 1 schematically illustrates a computing system 100 comprising an information network 110, and an information network management system 120. The information network 110 comprises IT (Internet Technology) infrastructure 112 and monitors 114. The information network 110 may comprise one or more data centers, a cloud computing platform, or any other type of information processing networks, or combinations of computer networks and computing platforms. The IT infrastructure 112 represents any combination of logical and physical elements, including, but not limited to, servers, databases, hardware, software, storage system, and/or networking resources, which are utilized to implement the information network 110 for one or more target applications. The monitors 114 comprise hardware/software processing systems that are disposed at strategic locations within the information network 110 to perform various functions, such as collecting managed data of logical and physical elements, detecting out of tolerance conditions, and generating events/alarms based on the collected data and detected conditions.

The information network management system 120 comprises a network object discovery module 125, a network topology model processing module 130, a report generator module 135, an event/alarm detection module 140, a causality matrix and codebook processing module 145, a root cause analysis (RCA) module 150, a plurality of databases 160 that maintain information which is utilized and generated by the information network management system 120 to perform various network management and root cause impact analysis (or event correlation) functions as discussed herein, and a message bus 170 to exchange data and between the various system components. The network topology model processing module 130 comprises an expression engine 132, a delta codebook generator module 134, and a symptom extraction module 136. The RCA module 150 comprises a context processing module 152, and an event correlation engine 154. The databases 160 comprise a physical and logical object library 162, a topology repository of network object and relationship instances 164, detected problems 166, and causality matrices and codebooks 168. The various components of the information network management system 120 collectively operate to perform various network and systems management operations. Such operations include, but are not limited to, (i) automatically discovering/identifying constituent objects (logical objects and physical objects) of the IT infrastructure 112 (e.g., servers, routers, firewalls, applications, databases, network resources, etc.), (ii) identifying "critical" (or authentic) problems that can arise with the discovered/identified objects, which can adversely impact services provided by the information network 110, (iii) identifying a set of one or more symptoms (observable events) that can be used to recognize such critical problems, (iv) real-time monitoring and detection of symptom events (alarms) within the information network 110, which are indicative of potential critical problems within the information network 110, and (v) utilizing the detected symptom events to perform various functions such as real-time event correlation and root cause analysis to identify and rectify critical problems that actually arise within the information network 110.

More specifically, the network object discovery module 125 implements methods that are configured to automatically discover the constituent logical and physical elements of the IT infrastructure 112 of the information network 110 environment that is managed by the information network management system 120. In addition, the network object discovery module 125 implements methods that are configured to map the relationships and dependencies between the discovered elements of the IT infrastructure 112. During an auto-discovery process, the network object discovery module 125 can probe each managed object of the IT infrastructure 112 to determine its configuration and its relationship to other managed objects within the IT infrastructure 112.

The event/alarm detection module 140 implements methods that are configured to detect and capture events and alarms that are generated by the monitors 114 and other elements within the information network 110. In this regard, the monitors 114 within the information network 110 monitor data from various objects/elements of the IT infrastructure 112, and the data is collected by the event/alarm detection module 140. The network object discovery module 125 can utilize events and alarms, which are detected/captured by the event/alarm detection module 140, to determine changes in the IT infrastructure 112, which may or may not be due to faults. In this regard, the network object discovery module 125 is a source of topology information (e.g., entire topology, or delta topology) which is provided to the network topology model processing module 130 to generate and/or update an abstract topology model (or domain model) of the information network 110 that is being managed.

The network topology model processing module 130 implements methods that are configured to abstract the constituent physical and logical objects/elements of the IT infrastructure 112, as well as their relationships, behaviors, and interactions, to define a topology model. The topology model generally comprises an event model and a propagation model for classes of components in the information network 110, and can be implemented using known modeling techniques which are suitable for the given application. For example, the specification of the topology model can include exceptional events associated with each class of component, their corresponding local symptoms, and the potential relationships with other components along which events can propagate. An exceptional event may be an event that requires some handling action (e.g., a problem such as a defective disk drive, or adding a workstation to a LAN)

while a symptom may be an observable event (e.g., excessive read/write errors for the disk, or a change in routing tables) caused by the exceptional event. Events may propagate between objects along relationships associated with their classes. For example, components of a type "LINK" may have an exceptional event "LINK FAILURE". Links may have a relationship "connected-to" with components of type NODE. Link failure can propagate from a LINK to a NODE along this "connected-to" relationship, being observed in NODE via the symptom "NODE-UNREACHABLE".

In some embodiments, the physical and logical object library 162 (or "generic object library") comprises an object-oriented library of generic physical and logical objects which are modeled as generic classes of objects. In one embodiment, the network topology model processing module 130 is configured to implement a common information model (CIM) (e.g., InCharge Common Information Model (ICIM)) across IT and business domains. The CIM implements object-oriented modeling techniques to generate a conceptual and structural view of a system topology for system management, and provides a unified representation and classification of logical and physical entities that describe their state, behavior, and relationships.

In particular, the physical and logical object library 162 comprises a comprehensive set of generic models (or object classes) for various types of physical and logical objects that can be present within an information network and managed by the information network management system 120. These generic models include those attributes that are common to all object instances of a given class, the kinds of relationships that can exist with other instances of the same or different classes of objects. The various physical and logical elements within an information network are modeled in an object-oriented representation as generic classes of objects, including the attributes of the object, the relationships it can participate in with other objects, its critical problems, the characteristic symptoms each problem causes, and how the problems propagate along relationships to related objects. In other words, the physical and logical object library 162 comprises generic object behavior models that describe problems, symptoms of the problems, and propagation of the problems, for different classes of objects that are modeled.

By way of example, the types of model entities (classes) in the object library 162 include, for example, physical entities (e.g., servers, routers, switches, cards, ports, interfaces, etc.), logical entities (e.g., protocols, logical ports, etc.), and applications (e.g., service offerings). The properties of such object classes include, for example, attributes (e.g., name and operational status), relationships (e.g., composition and connectivity), events, authentic problems, etc. The model is basically a library of generic physical and logical objects that include attributes, relationships it can participate in with other objects, authentic problems, characteristic symptoms of problems it can cause, and how the problems propagate to related objects. The generic library of object models 162 comprises rich semantics of data attributes, relationships, authentic problems and impacts, symptoms each problem causes, and how they propagate along relationships.

The topology repository of network object and relationships instances 164 (or "topology repository") comprises a repository of object instances which is built and updated automatically when discovered objects of the IT infrastructure 112 are instantiated with object models defined in the object library 162. More specifically, object and relationship instances discovered in the information network 110 are instantiated with the library of generic objects 162 to automatically become part of a real-time inventory of, or repository for, the managed environment. The topology repository 164 represents a real-time inventory that is built automatically by instantiating object classes from the library with the instances found during discovery. This inventory of object instances is referred to as the "topology" or "domain model". The topology (or domain model) comprises a list of discovered entities representing the objects constructed automatically by applying behavior models to the discovered infrastructure. It represents physical and logical objects in the managed environment and their relationships and is used to compute problem signatures for codebooks. The topology repository 164 comprises a representation of the specific information network 110, which is constructed by instantiating generic objects from the object library 162 and populated using information from the network object discovery module 125 and the event/alarm detection module 140.

Through incoming alarms, changes in the infrastructure, which may or may not be due to faults, are found by the discovery process. If a new device, such as a router or switch, is added to the network, the repository can be automatically updated to include the new device and its relationships with other devices in the network. During auto-discovery, each managed device is probed to determine its configuration and its relationship to other managed entities. With this information, the network topology model processing module 130 creates instances and fills in the properties described in the class model. The properties of a class serve as a template for all possible instances of that class, while the properties of an instance of a class describe a specific managed element in the managed domain.

The causality matrix and codebook processing module 145 implements methods that are configured to generate and update causality matrices and codebooks which are stored in the database of well-formed causality matrices and codebooks 168, and which are utilized by the root cause analysis module 150 to perform event correlation and root cause analysis operations, as discussed herein. A causality matrix (or codebook) is a data structure with information that represents which symptoms or alarms occur when a given problem arises in a managed environment. It uses the concept of "signatures" to identify problems, where real-time events are matched with the problem signature. Problem signatures, which are a set of symptoms that create a unique identifier for a problem, are derived from the object library 162 and the repository 164. These signatures are stored in a codebook. Example embodiments of a causality matrix and codebooks will be discussed in further detail below with reference to FIGS. 2A, 2B, and 2C. Although the causality matrix and codebook processing module 145 is shown as a separate module in FIG. 1, it is to be understood that the module 145 can be utilized by, or otherwise integrally included as part of, the RCA module 150 and/or the network topology model processing module 130.

The expression engine 132 implements methods that are configured to process a topology (or domain model) of the managed information network 110, and generate a semantic model (e.g., topology node graph) which can be processed using suitable techniques to determine, for each problem of managed objects in the topology node graph, a set of symptoms associated with the problem based on causality relationships between problems and symptoms defined in the domain model. The processing results of the expression engine 132 can be utilized by the causality matrix and codebook processing module 145 to generate an initial causality matrix and one or more associated codebooks for the target domain.

The delta codebook generator module 134 implements methods that are configured to generate a delta causality matrix (or delta codebook) directly from a delta topology information representing current changes to a given topology. As explained in further detail below, the expression engine 132 imports information regarding topology changes (delta topology) provided by the network object discovery module 125, updates the semantic model (e.g., topology node graph) to include new and/or modified objects, and propagates the attributes to the expressions associated with the new and/or modified objects, to generate information that is utilized by the delta codebook generator module 134 to generate a delta codebook directly from the delta topology information.

The symptom extraction module 136 is configured to continually receive an event stream from the event/alarm detection module 140, and extract events from the receive event stream which are indicative of symptoms that are relevant to analysis and detection of critical (or authentic) problems by the RCA module 150.

The RCA module 150 is configured to compare a current set of symptoms (active symptom stream), which have been observed in the information network environment, with signatures in a causality matrix or codebook, to find the signature or signatures with the closest match. The problem having a signature with the closest match is deemed a root cause problem of the current set of symptoms. In particular, the event correlation engine 154 utilizes a causality matrix (or codebook) along with a set of active symptoms, to detect a set of problems that best explain the set of active symptoms. In one embodiment, the processing functions of the event correlation engine 154 are distributed over different processing modes to perform computation in parallel to increase the speed of performing event correlation and root cause analysis functions, the details of which will be explain in further detail below with reference to FIG. 4B.

The context processing module 152 implements methods for building and modifying contexts using a delta codebook generated by the delta codebook generator module 134. A context comprises a set of events (problems and symptoms) which have some relation, and which are independent from other contexts. For example, problems that share the same symptom are considered to belong to the same context and vice versa. An exemplary embodiment of the context processing module 152 and its corresponding functions will be explained in further detail below with reference to FIG. 4B.

The root cause problems that are detected by the RCA module 150 are maintained in the database of detected problems 166. The report generator module 135 is configured to utilize the information contained in the database 166 to generate and output a report which indicates the most likely problem or problems based on the set of currently detected symptoms. In addition, the report generator module 135 can implement problem solving capabilities, wherein the report generator module 135 can specify corrective actions to solve problems, or otherwise trigger corrective actions automatically through interaction with other modules of the information network management system 120 that are configured to trigger automated or semiautomated actions or processed to correct detected problems, etc.

FIG. 2A illustrates an example embodiment of a causality matrix 200 which can be generated by the causality matrix and codebook processing module 145 of FIG. 1. The example causality matrix 200 (alternatively, correlation matrix 200) comprises a well-formed correlation matrix for six (6) problems p1, p2, p3, p4, p5 and p6, and twenty (20) symptoms. The causality matrix 200 comprises a plurality of rows and columns which define a plurality of cells, each cell corresponding to an intersection of one row and one column. The problems are presented as columns in the causality matrix 200 and symptoms are presented as rows in the causality matrix 200. Each cell contains a value (in this example, either 0 or 1) indicating whether or not a particular symptom is caused by a given problem. Although zeros and ones are shown in FIG. 2A (providing a deterministic model), the cell values can be any value which would indicate the probability that the given event causes a corresponding event (providing a probabilistic model). While the causality matrix 200 is depicted as a two-dimensional data structure the causality matrix 200 is a multi-dimensional matrix which can contain numerous probabilities and other relevant information.

The causality matrix 200 represents which symptoms or alarms occur when the problem arises in an environment. It uses the concept of "signatures" to identify problems, where real-time events are matched with the problem signature. A problem is an event that requires handling, while a symptom is an event that may be observed. Each occurrence of a problem typically exhibits a multitude of symptoms: symptoms in the faulty element and symptoms in related elements. Although the symptoms of different problems can overlap, each problem has a unique set of symptoms; called its signature. These signatures are used to build one or more codebooks so that problems can be identified by matching as closely as possible the currently known symptoms to the identified signatures within the codebook.

A codebook is a set of symptoms whose respective rows in a correlation matrix provide a distinct code for every problem. Various data reduction methods can be utilized to convert a correlation matrix into a codebook. In general, a process for determining an optimal codebook involves reducing the amount of information in the causality structure to the minimum amount that is required to identify problems. This may be done by finding a minimal subset of the symptoms that provide an acceptable level of problem identification. The optimal codebook can also be used to identify those symptoms which would provide the greatest information benefit if monitored. The resulting codebook provides an efficient arrangement of information for real-time decoding by a computer.

One approach for further reducing the size of codebooks is to develop a measure of distance among codes and use this measure to determine the distinguishability among the codes. A process can then be used to generate codebooks that accomplish a desired level of distinguishability using a minimal set of symptoms. For example, a Hamming distance between two problems (or codes) is the number of coordinates where the two codes are not similar. This distance measures the distinguishability between the codes of the respective problems for a given set of symptoms. The radius of a set of problems P in a given matrix is the minimal distance between the codes of the set of problems P relative to a set of symptoms S. The radius measures the minimal (worst case) distinguishability between the codes of P.

FIG. 2A shows a well-formed deterministic correlation matrix (i.e., all problems cause certain symptoms with certainty) for 6 problems P producing 20 symptoms S, wherein the Hamming radius for these problems is r(P)=7 (i.e., the minimal distance of 7 is obtained between problems 1 and 3 and between problems 2 and 3). One can thus generate optimal codebooks for P that accomplish a Hamming distance of up to 7. FIG. 2B illustrates an optimal codebook 201 with a target distance measure of d=1, which is generated from causality matrix 202 of FIG. 2A. As another example, FIG. 2C shows an optimal matrix for the same correlation matrix of FIG. 2A generated with a radius of 2 instead of 1.

Various known techniques can be utilized for generating causality matrices and codebooks. For example, the causality matrix and codebook processing module 145 can implement the techniques for generating causality matrices and codebooks as disclosed in U.S. Pat. No. 5,661,668, entitled Apparatus and Method For Analyzing and Correlating Events in a System Using a Causality Matrix, which is incorporated herein by reference.

As in known in the art, a causality matrix can be generated from a causality graph. A causality graph comprises a set of set of numbered nodes, each representing an event (problem or symptom) in a given system, along with directed edges (arrows) connecting the nodes, wherein each directed edge represents a causality relationship between the events connected by a directed edge. For example, FIG. 3 illustrates a causality graph 300 comprising a plurality of nodes which comprise problem nodes p1, p2, p3, p4 and p5, and symptom nodes s1, s2, and s3. As shown in FIG. 3, problems p1 and p2 cause symptom s1, problems p2 and p3 cause symptom s2, and problems p4 and p5 cause symptom s3. FIG. 3 illustrates an exemplary embodiment in which different disjoint subgraphs of events (of a given causality graph) form different contexts 301 and 302 which are independent from each other, wherein problems that share the same symptom are considered to belong to the same context and vice versa.

Figure 4A:
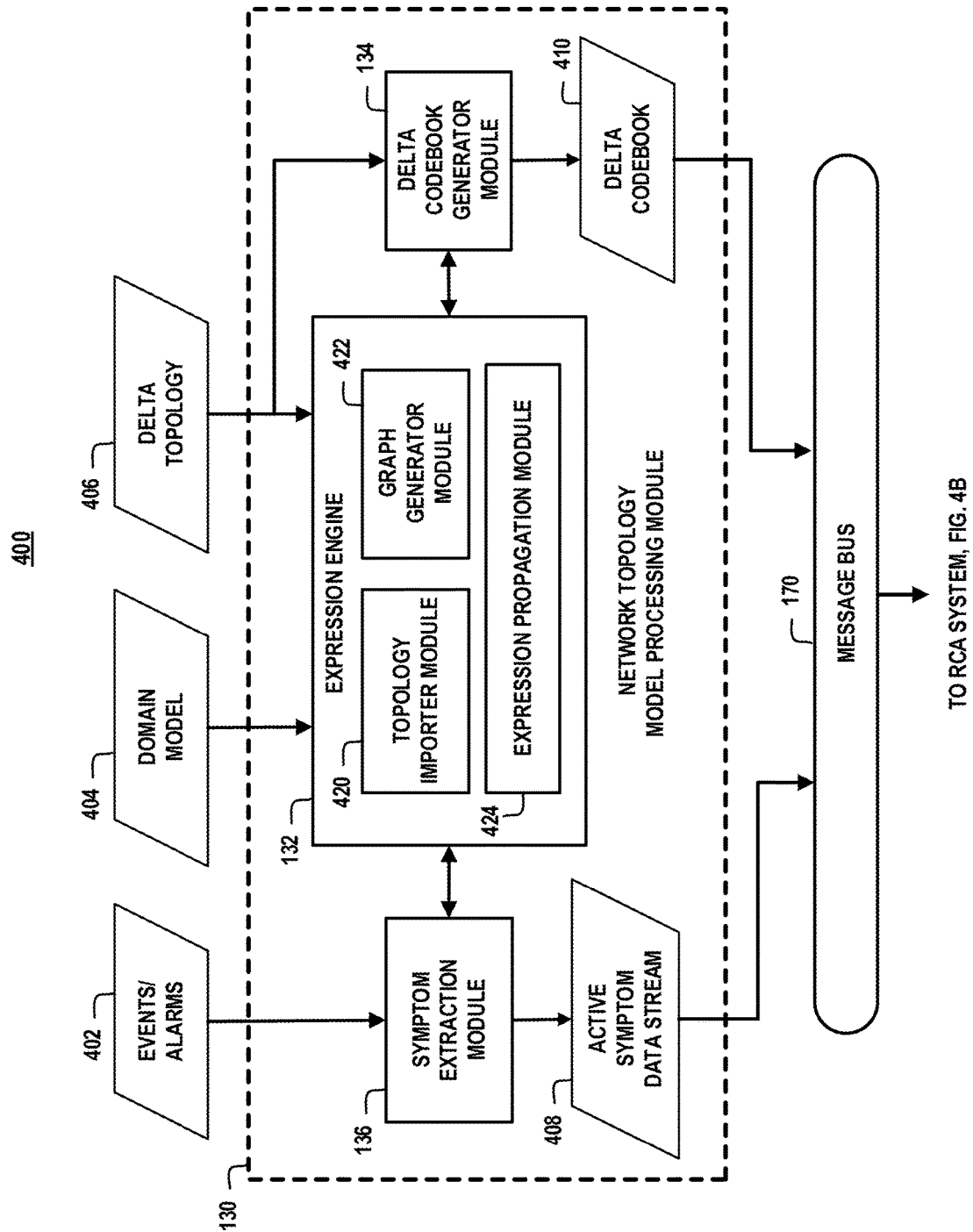
FIGS. 4A and 4B illustrate a method for performing real-time event correlation analysis for an information network, according to an embodiment of the invention.
Figure 4B:
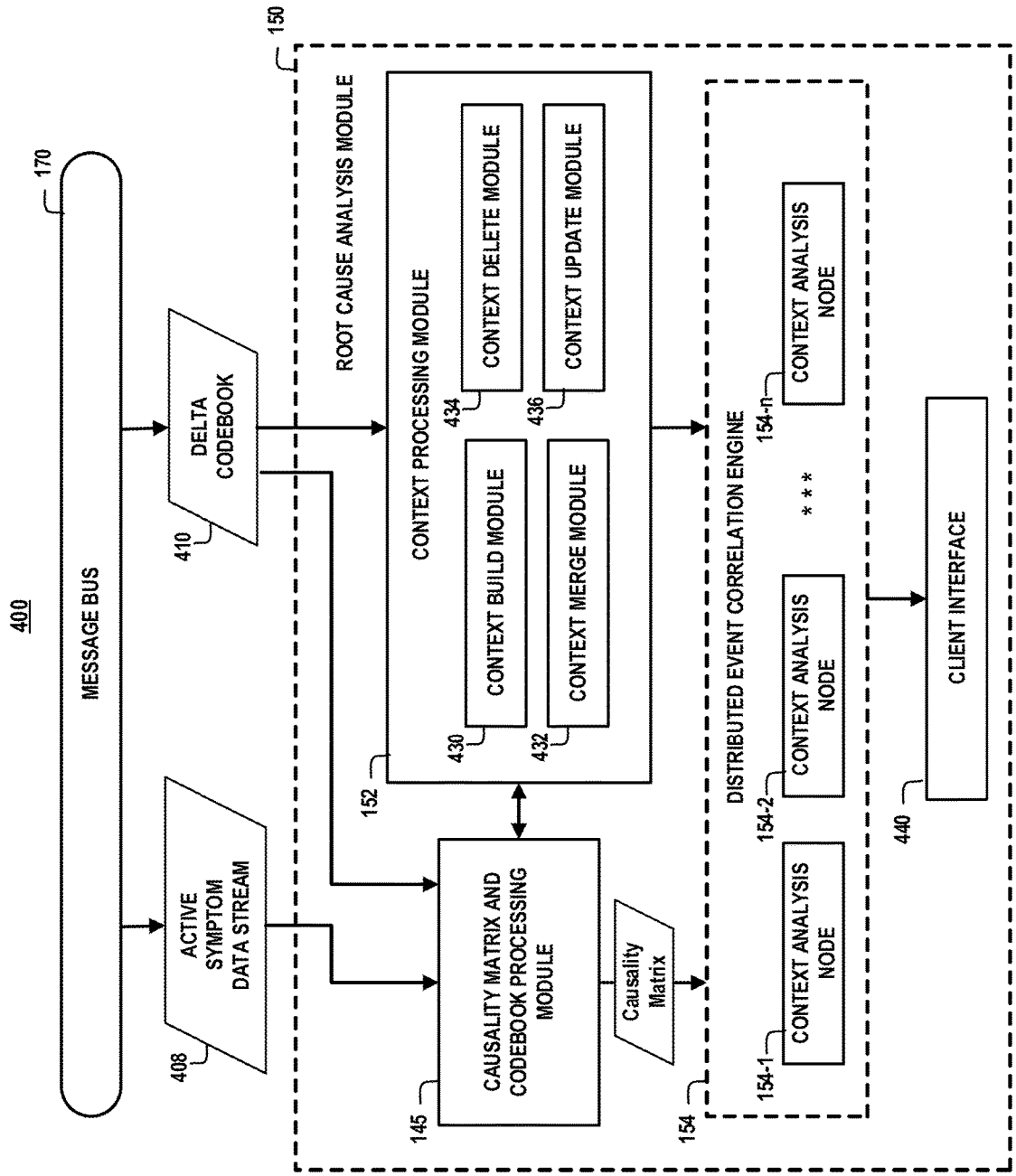

FIGS. 4A and 4B illustrate a method for performing real-time event correlation analysis for an information network, according to an embodiment of the invention. In particular, FIGS. 4A and 4B schematically illustrate a runtime implementation of a system 400 comprising the network topology model processing module 130 (FIG. 4A) and the RCA module 150 (FIG. 4B) of the information the network management system 120 of FIG. 1, according to an embodiment of the invention. As shown in FIG. 4A, the network topology model processing module 130 receives as input, an event/alarm data stream 402, a domain model 404, and delta topology data 406, and generates an active symptom data stream 408 and a delta codebook 410. The active symptom data stream 408 and the delta codebook 410 are output on the message bus 170 for processing by the RCA module 150 (FIG. 4B). FIG. 4A illustrates an exemplary embodiment of the expression engine 132 comprising a topology importer module 420, a graph generator module 422, and an expression propagation module 424, the functions of which will be described in further detail below.

As shown in FIG. 4B, the active symptom data stream 408 and delta codebook 410 are received by the RCA module 150 over the message bus 170. The RCA module 150 utilizes the causality matrix and codebook processing module 145 to process the active symptom data stream 408 and the delta codebook 410 to update the causality matrix and associated codebooks which are utilized by the event correlation engine 154. In one embodiment, the context processing module 152 comprises a context build module 430, a context merge module 432, a context delete module 434, and a context update module 436, the functions of which will be explained in further detail below. As further shown in FIG. 4B, the event correlation engine 154 comprises a distributed engine which utilizes a plurality (n) of context analysis nodes 154-1, 154-2, . . . , 154-n to process independent contexts and perform distributed event correlation processing. The context analysis nodes 154-1, 154-2, . . . , 154-n can be different processors, virtual machines, containers, server nodes, etc., which operate on different contexts concurrently, in parallel, to expedite event correlation processing. The distributed processing results of the event correlation engine 154 are collected and aggregated by a client interface 440 for further analysis or executing corrective actions.

Referring to FIG. 4A, the expression engine 132 performs various functions to support a real-time event correlation process. For example, the topology importer module 420 is configured to import a relevant domain model 404 (or topology) from the repository 164 (FIG. 1) for the managed information network. As noted above, the domain model 404 (or topology) comprises a set of classes having attributes, which represent the physical and logical objects in the managed information network environment and their relationships, as well as causality defined between problems and symptoms in the system. The domain model 404 (or topology) comprises a set of discovered entities representing the objects constructed automatically by applying behavior models to the discovered infrastructure.

The topology importer module 420 is further configured to import the delta topology data 406, which provides information regarding changes (e.g., additions, deletions, modifications, etc.) to an existing domain model 404 (or topology) of the managed information network environment. As noted above, through operation of the network object discovery module 125 and event/alarm detection module 140 (FIG. 1), changes in an existing topology infrastructure can be found. If a new device, such as a router or switch, is added to the information network, the currently existing domain model 404 for the given information network within the repository 164 can be automatically updated to include the new device and its relationships with other devices in the information network based on the delta topology information 406.

The graph generator module 422 implements methods that are configured to generate a semantic model of the managed information network environment based on the associated domain model 404. In one embodiment, the graph generator module 422 implements a vertex-centric graph modeling program which is configured to generate a semantic model of the given topology in the form of a topology node graph with vertices and directed edges, wherein the vertices within the topology node graph correspond to respective ones of the classes of the domain model. In this regard, the topology node graph is an example embodiment for implementing an "event model" and associated "propagation model," which defines the objects within the given topology, the events which can be generated by the objects, the relationship between objects, and the events that may propagate along relationships to and from related objects.

The expression propagation module 424 implements methods that are configured to determine the set of all events (exceptional and observable) that can occur based on the event and propagation models instantiated by the semantic model (and defined by the domain model). Each object in the configuration may generate any of the events specified for its class in the event model. The set of events in a given configuration is a union of all the events that can be generated by all of the objects in the given configuration.

In one embodiment, the expression engine 132 implement methods for generating semantic models, performing event propagation, and generating a causality matrix using graph processing techniques as disclosed in U.S. Pat. No. 9,811,588, entitled Method and Apparatus For Generating Causality Matrix and Impacts Using Graph Processing, the disclosure of which is fully incorporated herein by reference. In another yet related embodiment, the expression propagation module 424 implements a programming model that is adapted for large-scale node graph processing such as the Pregel programming model. As is known in the art, the Pregel programming model fundamentally utilizes message passing between vertices in a graph. Pregel organizes the message passing into a sequence of iterations called "supersteps" which, in the context of the embodiments discussed herein, are utilized to perform event propagation operations based the event propagation model for the given topology node graph, and thereby determine the set of events that can occur for the given configuration of the managed environment. The expression propagation module 424 propagates updates to dependent expressions in any vertices. The propagation and associated computation are driven by the definitions in the domain model.

In one embodiment, during operation, the expression engine 132 is configured to import the delta topology data 406 (which represents current changes in an existing topology), and utilize the delta topology data 406 to update the existing topology node graph (via the graph generator module 422) and propagate the attributes to the expressions associated with the objects (via the expression propagation module 424). In one embodiment, the expression engine 132 is configured to generate a causality matrix. In one embodiment, to increase processing speed and performance, rather than creating an entire problem-symptom matrix/codebook after each discovery, the delta codebook generator module 134 is utilized to generate a delta codebook 410 directly from the delta topology data 406. The process of computing a full codebook is computationally one of the most expensive tasks in the event correlation engine. The expression engine 132 imports the delta topology data 406 from the network object discovery module 125 (FIG. 1) in the form of network objects (nodes and relationships) that are either added, removed or modified.

More specifically, based on the given domain model 404, the input delta topology data 406 can indicate the following types of changes for a given topology node graph. For example, one or more existing nodes in the topology node graph can be updated, wherein one or more pre-discovered network objects undergo changes in terms of their relationships with other objects which may or may not be newly discovered. The update would result in further division on the basis of how the objects are processed. For example, the problems or symptoms corresponding to the existing network objects can be updated according to the changes in the relationships in the network. Further, new instances for problems and symptoms of existing network objects can be created.

Another type of topology change involves creating new nodes in the topology node graph. With this change, for every newly discovered network node or relationship, new instances for problems and symptoms corresponding to the domain class of the objects are created to be added to the problem-symptom matrix.

In one embodiment, the provision for updating an existing problem instance triggers the creation of a delta codebook and sending the delta codebook to the RCA module 150 over the message bus 170. In other words, each time a function call to update an existing problem is executed (e.g., to add a new symptom or remove one of the existing symptoms caused by the problem), the resulting change would be sent to the RCA module 150 in the form of the new problem-symptom pair formed with the corresponding causal probability. For a newly detected problem-symptom pair, the new pair formed is passed to the RCA module 150 over the message bus 170. For real-time processing, a continuous stream of delta topology data is transmitted on the message bus 170 from the network object discovery module 125 to the expression engine 132, with the provision to hold the deltas until accessed by the RCA module 150 for processing.

In some embodiments, the delta codebook 410 is utilized to modify contexts. As noted above, a codebook is a problem symptom matrix which includes information that demonstrates which problem causes which symptoms. Symptoms are manifestations of problems. Problems are observed through the symptoms they cause. A symptom expression, which represents an element in the closure of a problem, captures an instance of a Boolean expression and two properties that describe the symptom, namely a loss probability and a spurious probability. The loss probability indicates how likely a symptom is lost and is not received by the management system (then eventually by the expression engine). In other words, the loss probability represents a probability that an observable basic event is lost or not observed (its expression does not evaluate to TRUE) even though it is occurring. The spurious probability indicates how likely a symptom received by the management system is not actually observed. In other words, the spurious probability of a symptom represents a probability that the observable event (symptom) is not occurring, even though the event expression evaluates to TRUE. These probability properties are utilized by a codebook correlation engine to more accurately deduce the causes of the observed symptoms.

The problem expression for a given object comprises a single a priori probability, and a list of one or more causes statements, which are each associated with a causal probability. A causes statement defines the relationship between a problem and a set of symptoms. The a priori probability of a given problem indicates how likely the problem occurs without considering any observed symptom. The causal probability of a given problem defines how likely the associated symptom is observed given the occurrence of the problem. Similarly, these two properties are required for the codebook correlation engine and thus are part of the problem closure sent to the codebook engine. In other words, the probability of a problem causing a certain symptom is referred to as a causality probability.

In FIG. 4A, the delta codebook 410 represents a change between codebooks of a previous cycle and current cycle. The delta codebook 410 is used to update the correlation matrix of the RCA module 150. A delta codebook can be one or several types: (i) new problem-symptom relationships added/updated, and (ii) previous problem-symptom relationships deleted. The following example embodiment illustrates a delta codebook syntax:

```
Added:    # problem p1
          p1(0.01) s1(0,0,0.9)
          # all probability values are given on a single line
          # problem p2
          p2 s1 s2 # use default probability values
          p2(0.05) # update a priori of p2
          s1(0,0) # update spurious of s21
          s2(0,0)
          # update loss and spurious of s22
          p2=>s1(0.4) # update causal of p2=>s21
          p2=>s2(0.8)
          # the above 5 lines do the same thing as this single line:
          # p2(0.05) s21(0,0,0.9) s22(0,0,1)
```

-continued

```
            # problem c:i:p3
            # c:i:p3(0.01) c:i:s31(0.05,0.001,0.9) c:i:532(0,0.002,0.9)
            p3(0.4) s2(0,0,1)
            # problem p4
            p4 s3(0,0,0.3)
            p5 s3(0,0,0.7)
Deleted:    p11(0.01) s11(0,0,0.9)
            P22 s11 s12
            c:i:p3(0.01) c:i:s31(0.05,0.001,0.9) c:i:532(0,0.002,0.9)
```

The values in the parenthesis after the problems (e.g., p1, p2) represent an a priori probability, which is the probability of the occurrence of the problem. The values in the parenthesis after the symptom (e.g., s1, s2) represent causal probability, loss probability, and spurious probability, respectively. The causal probability is the probability that a problem will a cause a given symptom. The loss probability is the probability of the symptom signal being erroneously reported as inactive (i.e. false negative), and the spurious probability is a false positive. In the above example, probability values of 0 are default values. The delta codebook (or delta causality matrix) represent a delta portion of a code book (e.g., changes in rows and columns of a code book) that is computed by the expression engine so that RCA module does not have to recompute the code book in its entirety based on topology changes.

As noted above, a correlation matrix comprises problem dictionaries and symptom dictionaries. In the correlation matrix, each problem has a unique Event ID, an apriori probability, a list of symptoms caused by the problem, the corresponding list of causal probability of the symptoms, and a Context ID. Similarly, a symptom has a unique Event ID, a loss probability, a spurious probability, status of the symptom (active or suspended), a list of problems that cause the given symptom, and a Context ID. The Context ID of an event (problem or symptom) identifies a context which the event belongs to. If an event does not belong to any context, the Context ID of the event is set to a default Context ID of −1. Even though the input from the expression engine 132 is only the difference, the correlation matrix maintains the entire information of the codebook. Depending on the data in the delta codebook 410, corresponding changes are made in the correlation matrix, such that it represents all the information of the complete codebook.

The delta codebook is also used to build and modify contexts. As noted above with reference to FIG. 3, different disjoint subgraphs of events form different contexts. All contexts are independent from each other, wherein problems that share the same symptom belong in the same context and vice versa. Changes in the codebook result in changes in the contexts. As shown in FIG. 4B, the delta codebook 410 is input to the context processing module 152. Depending on the input of the delta codebook 410, the context processing module 152 performs one or more operations of building a context, merging contexts, deleting contexts, and/or updating contexts. In real-time event correlation, building contexts from scratch each time the RCA module 150 receives a delta codebook 410 as input would be computationally expensive and time consuming. A such, the various context processing operations performed by the context processing module 150 can reduce the time needed for determining the root cause in real time or near real time since the process does not need to traverse every node every time there is a change in the codebook.

The context build module 430 implements methods that are configured to build contexts. The context build operation is performed during an initial stage when all objects in the given information network environment being managed have been discovered for the first time, the correlation matrix is empty and all the problems and symptoms in the codebook do not yet belong to any context. The context build module 430 does not process the delta codebook 410 directly, but utilizes the causality matrix (generated by the causality and codebook processing module 145) to traverse through the event nodes (problems and symptoms) and build contexts.

In one embodiment, contexts are built by adding an unvisited problem in the queue. A topmost element of the queue is then removed and expanded by adding all symptoms, which the problem causes, to the queue. If the first element of the queue is a symptom, it is expanded by adding all problems, which cause the symptom, in the queue. All the removed elements are added to the same context as they closely related to each other. This process continues until the queue is empty. When the queue is empty, this means that all events which belong to the context have been added and the context is complete. For the remaining unvisited problems and symptoms, the same process is initiated and performed, to build another new context with a different Context ID until there are no unvisited nodes left for processing. While adding a problem or symptom to a context, the Context ID of the given problem or symptom is assigned as the Context ID of the context it belongs to.

The context merge module 432, the context delete module 434, and the context update module 436 perform respective operations by directly utilizing the delta codebook 410 sent from the expression engine 132, and not the correlation matrix of the RCA module 150. The context merge, delete, and update operations process the information from the delta codebook 410 line by line, wherein one problem-symptom relationship is processed at a time, and a corresponding modification is made to the contexts.

When the context processing module 152 receives the delta codebook 410 with data that indicates one or more newly added/updated problem-symptom relationships, the context processing module 152 will call the context merge module 432 to perform context merging operations. The context merge module 432 will determine for each new problem, whether the new problem existed previously by checking its unique ID. If the new problem is not present, a new problem is created with a default Context ID of −1. Similarly, the context processing module 152 verifies the same for the associated symptom. If both the problem and symptom existed previously, but belong to different contexts, the different contexts are merged into a new context. The new context is created and all the nodes of both the contexts are merged into the new context and a new Context ID is assigned to every node of the merged contexts.

When the delta codebook shows that a problem-symptom relationship is deleted, the context processing module 152 will call the context delete module 434 to perform a context delete operation. A context delete operation can result in splitting a given context into several new contexts. In particular, after deleting a problem-symptom relationship, if the given symptom can be reached from the given problem, then there is no need to split into two. On the other hand, if the given symptom cannot be reached from the given problem, then the problem and symptom should belong in different contexts, using the following exemplary process.

The given problem is added to a queue. A topmost event node is removed from the queue. If the topmost node was a problem, then it is expanded by adding all the symptoms it causes in the queue. If the topmost node was a symptom, then it is expanded by adding all the problems it causes in the queue. This continues until the queue is empty. Each event node in the queue is added in a newly created context and is assigned a new Context ID. In addition, if the new context contains the symptom whose relationship with the given problem was just deleted, then the previous context is deleted as there is no split of the context. Otherwise, all the event nodes which belong to the new context from a previous context are removed. Another approach to achieve this can be starting from symptom and adding all the nodes that it can reach to a new context and then deleting the previous context. After deleting the relationship, if a given problem does not cause any symptoms or if a given symptom is not caused by any of the problems, the given problem and/or given symptom is deleted from the correlation matrix.

When the context processing module 152 receives the delta codebook 410 with data that indicates one or more newly added/updated problem-symptom relationships, the context processing module 152 will call the context update module 436 to perform context update operations. The context update module 436 will determine if the new/updated problem previously existed by checking its unique Context ID. If it is determined that the problem does not exist, a new problem is created with a default Context ID of −1. Similarly, it verifies the same for the given symptom. If both the problem and symptom are determined to not previously belong to any contexts, then a new context is created and the given problem and symptom are added to the new context.

If both the problem and symptom belong to the same context, and the given problem already causes the given symptom, then only the probabilities are updated. As such, only the probabilities will get updated in the correlation matrix of the RCA module 150, and no change in context will occur. On the other hand, if both the problem and the symptom belong to same context and the given problem does not cause the given problem, the corresponding matrix will get updated by adding the given symptom to the list of causal symptoms of the given problem and the given problem is added to the list of problems corresponding to the given symptom.

The system 400 of FIGS. 4A and 4B is configured to support auto scaling on various levels to expedite event correlation processing. For example, various computational segments over data structures such as graphs could be executed in parallel over a distributed system varying the number of executors as per the incoming workload, thereby, efficiently maximizing the use of available storage and processing resources and, more importantly, and significantly reducing the processing time for real-time event correlation.

By way of specific example, in the expression engine 132, after a topology node graph is generated by the graph generator module 422 using imported topology data, the expressions associated with each node/edge of the topology node graph need to be filled with reference to the domain model for the corresponding domain class. Multiple nodes can be processed in parallel with linking the attributes with the expression values being performed in parallel. Furthermore, propagated attributes (i.e., attributes which are dependent on the values of some other attributes which may belong to a neighboring node) need to be calculated for creating a propagating path. As noted above, in one embodiment, the propagation process is performed using Google's Pregel algorithm which traverses the entire graph sequentially to populate the graph attributes. Implementing the Pregel algorithm in an auto-scaled manner enhances the propagation process by making efficient use of the processing power that is available.

Once the contexts are built/modified, the RCA module 150 proceeds to determine the root cause in every context based on the active symptoms in the active symptom data stream 408. Since all the contexts are independent, a root cause amongst all the contexts can be determined in a distributed fashion by the distributed event correlation engine 154, wherein independent contexts are processed in parallel over one or more of the context analysis nodes 154-1, 154-2, . . . , 154-n. The causality matrix and codebook processing module 145 will update the causality matrix based on the active symptom data stream 408 and the delta codebook 410 to generate an updated causality matrix which is broadcast to each of the context analysis nodes 154-1, 154-2, . . . , 154-n, so that the information in the causality matrix can be read and utilized by the context analysis nodes 154-1, 154-2, . . . , 154-n to perform their respective functions.

In one embodiment, the context analysis nodes 154-1, 154-2, . . . , 154-n utilize probabilistic network analysis techniques to determine a certainty of all possible root causes given a current active symptom data stream. Such techniques are well-known in the art, the details of which are not necessary for understanding the invention. Briefly, root cause analysis can be performed using probability information. For example, a rule of the form "if A then B" can be augmented with a certainty factor: "if A then B with certainty 90%." The element of a probability network is a proposition, which is a hypothesis about the state of the system being monitored. For example, the hypothesis "node A is faulty" is a proposition. A probability is associated with each proposition, which is its a priori probability of truth. Additionally, probabilities can be assigned to the relationships between propositions. For example, "the truth of proposition A causes the truth of proposition B with probability 90%." When an event occurs, the probability of the proposition representing the occurrence of that event is updated to 100%, and this change is propagated to other propositions in the network based on the relationships. A diagnosis can be generated by simply listing those propositions having the highest probabilities. Probability networks may be advantageous in that they can produce hypotheses with a precise confidence level.

The distributed computing of the event correlation engine 154 can increase the event correlation analysis processing speed 10x or more as compared to conventional methods, which readily supports real time root cause analysis. Furthermore, the distributed event correlation engine 154 can be readily scaled depending upon the processing load. The distributed event correlation engine 154 can be implemented as an auto-scaling micro-service to enhance processing speed and manage resources more efficiently. The distributed event correlation engine 154 can be implemented using an open-sourced, distributed processing platform such as Apache Spark or Apache Flink.

Figure 5:
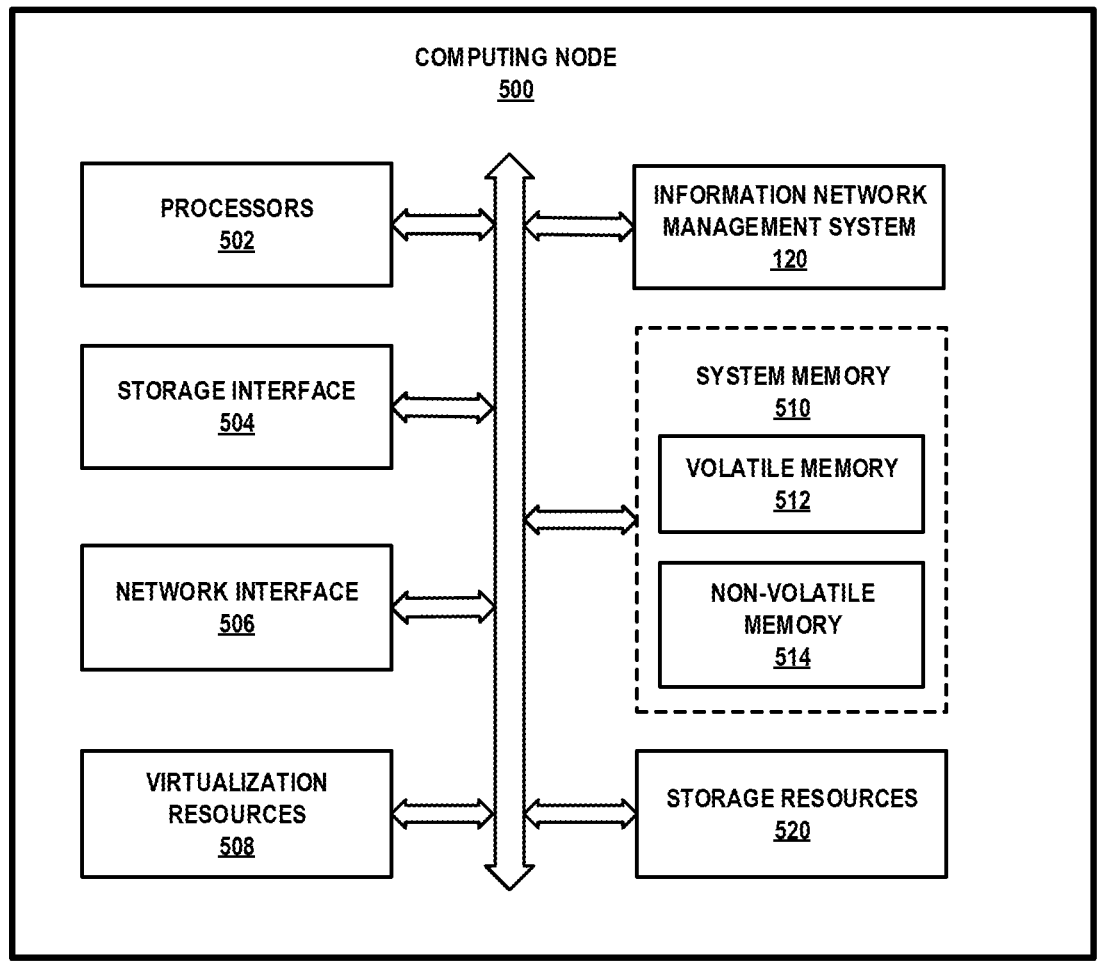
FIG. 5 schematically illustrates a computing node which can host an information network management system to provide automated, real-time event correlation analysis of an information network, according to an embodiment of the invention.

FIG. 5 schematically illustrates a computing node 500 which can host an information network management system to provide automated, real-time event correlation analysis of an information network, according to an embodiment of the invention. The computing node 500 (e.g., server machine) comprises hardware processors 502, storage interface circuitry 504, network interface circuitry 506, virtualization resources 508, system memory 510, and storage resources 520. The system memory 510 comprises volatile memory 512 and non-volatile memory 514. The storage resources

520 include one or more different types of persistent storage devices, or data storage arrays, such as hard disk drives (HDDs) or solid-state drives (SSDs), or other types and combinations of non-volatile memory.

The system memory 510 comprises electronic storage media such as random-access memory (RAM), read-only memory (ROM), or other types of memory, in any combination. The term "memory" or "system memory" as used herein refers to volatile and/or non-volatile memory which is utilized to store application program instructions that are read and processed by the processors 502 to execute a native operating system and one or more applications hosted by the computing node 500, and to temporarily store data that is utilized and/or generated by the native OS and application programs running on the computing node 500. For example, the volatile memory 512 of the system memory 510 may be a dynamic random-access memory (e.g., DRAM) or other forms of volatile random-access memory. The non-volatile memory 514 may comprise a storage-class memory (SCM) that is accessible as a memory resource. For example, the non-volatile memory 514 may be a NAND Flash storage device, a SSD (solid state drive) storage device, or other types of next generation non-volatile memory (NGNVM) devices.

In one embodiment, the computing node 500 hosts the information network management system 120 discussed above with reference to FIGS. 1 and 4. The constituent system components of the information network management system 120 comprise software modules that are persistently stored in one or more storage devices of the storage resources 520 and loaded into the system memory resources (e.g., volatile memory 512 and/or non-volatile memory 514), and executed by the processors 502 to perform respective functions as described herein. In this regard, the system memory 510 resources and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processors 502 may comprise one or more processors that are configured to process program instructions and data to execute a native operating system (OS) and applications that run on the computing node 500. For example, the processors 502 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphic processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 504 enables the processors 502 to interface and communicate with the system memory 510, the storage resources 520, and other off-infrastructure storage media, using one or more standard communication and/or storage control protocols to read data from or write data to volatile and non-volatile memory/storage devices. The network interface circuitry 506 enables the computing node 500 to interface and communicate with a network and other system components. The network interface circuitry 506 comprises network controllers such as network cards and resources (e.g., network interface cards, I/O adaptors, converged ethernet adaptors, etc.) to support communication protocols and interfaces including, but not limited to, PCI Express (PCIe), direct memory access (DMA) and remote DMA (RDMA) data transfer protocols, etc.

The virtualization resources 508 can be instantiated to execute one or more applications or functions which are hosted by the computing node 500. For example, the virtualization resources 508 can be configured to implement the various modules and functionalities of the information network management system 120. In one embodiment, the virtualization resources 508 comprise virtual machines that are implemented using a hypervisor platform which executes on the computing node 500, wherein one or more virtual machines can be instantiated to execute functions of the computing node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the computing node 500, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the computing node 500. In yet another embodiment, containers may be used in combination with other virtualization infrastructure such as virtual machines implemented using a hypervisor, wherein Docker containers or other types of LXCs are configured to run on virtual machines in a multi-tenant environment.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   performing, by a network management system, a network management process to provide automated event correlation analysis for an information network, wherein performing the network management process comprises:
   obtaining, by the network management system, delta topology information, wherein the delta topology information specifies modifications to a previous topology of the information network;
   generating, by the network management system, a modified topology of the information network based on the delta topology information;
   utilizing, by the network management system, the delta topology information to generate a delta causality matrix, wherein the delta causality matrix comprises information which indicates a difference in one or more problem-symptom relationships included in a causality matrix that is associated with constituent objects in the previous topology of the information network;
   utilizing, by the network management system, the delta causality matrix to modify at least one context which comprises a first set of related symptoms and problems associated with the constituent objects in the previous topology of the information network, such that the modified context comprises a second set of related symptoms and problems associated with constituent objects of the modified topology of the information network;
   performing, by the network management system, an event correlation operation utilizing the modified context and a set of current symptoms detected in the modified topology of the information network, to determine at least one problem within the modified topology of the information network which has a symptom signature that corresponds to the set of current symptoms, wherein performing the event correlation operation comprises (i) distributing the event correlation operation over a plurality of nodes to perform a plurality of context analysis operations, at least in part in parallel, using separate, independent contexts, and (ii) aggregating results of the plurality of context analysis operations to determine the at least one problem which has the symptom signature that corresponds to the set of current symptoms; and
   performing, by the network management system, at least one automated action to correct the at least one determined problem in the information network.

2. The method of claim 1, wherein the modifications to the previous topology of the information network include at least one of a new object added to the information network, an existing object removed from the information network, and a configuration change of an existing object in the information network.

3. The method of claim 1, further comprising utilizing the delta causality matrix to update the causality matrix associated with the previous topology of the information network.

4. The method of claim 1, wherein utilizing the delta topology information to generate the delta causality matrix comprises:
   utilizing the delta topology information to update an event model and propagation model of the previous topology of the information network to identify a new set of problem-symptom relationships associated with constituent objects of the modified topology of the information network;
   comparing the new set of problem-symptom relationships with a previous set of problem-symptom relationships associated with the constituent objects of the previous topology of the information network; and
   based on the comparing, specifying at least one new problem-symptom relationship in the delta causality matrix.

5. The method of claim 4, further comprising, based on the comparing, specifying at least one updated problem-symptom relationship in the delta causality matrix.

6. The method of claim 4, further comprising, based on the comparing, specifying at least one deleted problem-symptom relationship in the delta causality matrix.

7. The method of claim 1, wherein utilizing the delta causality matrix to modify at least one context comprises merging at least two existing independent contexts into a single context, in response to one of a new and updated problem-symptom relationship specified in the delta causality matrix.

8. The method of claim 1, wherein utilizing the delta causality matrix to modify at least one context comprises updating at least one existing context, in response to one of a new and updated problem-symptom relationship specified in the delta causality matrix.

9. The method of claim 1, wherein utilizing the delta causality matrix to modify at least one context comprises dividing at least one existing context into two independent contexts, in response to a deleted problem-symptom relationship specified in the delta causality matrix.

10. An article of manufacture comprising a processor-readable storage medium having stored program code of one or more software programs, wherein the program code is executable by one or more processors to implement method steps comprising:

performing, by a network management system, a network management process to provide automated event correlation analysis for an information network, wherein performing the network management process comprises:

obtaining, by the network management system, delta topology information, wherein the delta topology information specifies modifications to a previous topology of the information network;

generating, by the network management system, a modified topology of the information network based on the delta topology information;

utilizing, by the network management system, the delta topology information to generate a delta causality matrix, wherein the delta causality matrix comprises information which indicates a difference in one or more problem-symptom relationships included in a causality matrix that is associated with constituent objects in the previous topology of the information network;

utilizing, by the network management system, the delta causality matrix to modify at least one context which comprises a first set of related symptoms and problems associated with the constituent objects in the previous topology of the information network, such that the modified context comprises a second set of related symptoms and problems associated with constituent objects of the modified topology of the information network;

performing, by the network management system, an event correlation operation utilizing the modified context and a set of current symptoms detected in the modified topology of the information network, to determine at least one problem within the modified topology of the information network which has a symptom signature that corresponds to the set of current symptoms, wherein performing the event correlation operation comprises (i) distributing the event correlation operation over a plurality of nodes to perform a plurality of context analysis operations, at least in part in parallel, using separate, independent contexts, and (ii) aggregating results of the plurality of context analysis operations to determine the at least one problem which has the symptom signature that corresponds to the set of current symptoms; and performing, by the network management system, at least one automated action to correct the at least one determined problem in the information network.

11. The article of manufacture of claim 10, wherein the modifications to the previous topology of the information network include at least one of a new object added to the information network, an existing object removed from the information network, and a configuration change of an existing object in the information network.

12. The article of manufacture of claim 10, further comprising executable program code for utilizing the delta causality matrix to update the causality matrix associated with the previous topology of the information network.

13. The article of manufacture of claim 10, wherein utilizing the delta topology information to generate the delta causality matrix comprises:

utilizing the delta topology information to update an event model and propagation model of the previous topology of the information network to identify a new set of problem-symptom relationships associated with constituent objects of the modified topology of the information network;

comparing the new set of problem-symptom relationships with a previous set of problem-symptom relationships associated with the constituent objects of the previous topology of the information network; and based on the comparing, one of (i) specifying at least one new problem-symptom relationship in the delta causality matrix; (ii) specifying at least one updated problem-symptom relationship in the delta causality matrix; and (iii) specifying at least one deleted problem-symptom relationship in the delta causality matrix.

14. The article of manufacture of claim 10, wherein utilizing the delta causality matrix to modify at least one context comprises merging at least two existing independent contexts into a single context, in response to one of a new and updated problem-symptom relationship specified in the delta causality matrix.

15. The article of manufacture of claim 10, wherein utilizing the delta causality matrix to modify at least one context comprises updating at least one existing context, in response to one of a new and updated problem-symptom relationship specified in the delta causality matrix.

16. The article of manufacture of claim 10, wherein utilizing the delta causality matrix to modify at least one context comprises dividing at least one existing context into two independent contexts, in response to a deleted problem-symptom relationship specified in the delta causality matrix.

17. A system, comprising:

a computing node comprising;

system memory configured to store program code; and at least one processor configured to execute the stored program code to instantiate an information network management system which is configured to implement a process comprising:

performing a network management process to provide automated event correlation analysis for an information network, wherein performing the network management process comprises:

obtaining delta topology information, wherein the delta topology information specifies modifications to a previous topology of the information network;

generating a modified topology of the information network based on the delta topology information;

utilizing the delta topology information to generate a delta causality matrix, wherein the delta causality matrix comprises information which indicates a difference in one or more problem-symptom relationships included in a causality matrix that is associated with constituent objects in the previous topology of the information network;

utilizing the delta causality matrix to modify at least one context which comprises a first set of related symptoms and problems associated with the constituent objects in the previous topology of the information network, such that the modified context comprises a second set of related symptoms and problems associated with constituent objects of the modified topology of the information network;

performing an event correlation operation utilizing the modified context and a set of current symptoms detected in the modified topology of the information network, to determine at least one problem within the modified topology of the information network which has a symptom signature that corresponds to the set of current symptoms, wherein performing the event correlation operation comprises (i) distributing the event correlation operation over a plurality of nodes to perform a plurality of context analysis operations, at least in part in parallel, using separate, independent contexts, and (ii) aggregating results of the plurality of context analysis operations to determine the at least one problem which has the symptom signature that corresponds to the set of current symptoms; and performing at least one automated action to correct the at least one determined problem in the information network.

18. The system of claim 17, wherein the modifications to the previous topology of the information network include at least one of a new object added to the information network, an existing object removed from the information network, and a configuration change of an existing object in the information network.

19. The system of claim 17, wherein the information network management system is further configured to implement a process which comprises utilizing the delta causality matrix to update the causality matrix associated with the previous topology of the information network.

20. The system of claim 17, wherein in utilizing the delta topology information to generate the delta causality matrix, the information network management system is further configured to implement a process which comprises:

utilizing the delta topology information to update an event model and propagation model of the previous topology of the information network to identify a new set of problem-symptom relationships associated with constituent objects of the modified topology of the information network;

comparing the new set of problem-symptom relationships with a previous set of problem-symptom relationships associated with the constituent objects of the previous topology of the information network; and based on the comparing, one of: (i) specifying at least one new problem-symptom relationship in the delta causality matrix; (ii) specifying at least one updated problem-symptom relationship in the delta causality matrix; and (iii) specifying at least one deleted problem-symptom relationship in the delta causality matrix.

* * * * *